(12) United States Patent
Fein et al.

(10) Patent No.: US 6,349,316 B2
(45) Date of Patent: *Feb. 19, 2002

(54) DOCUMENT SUMMARIZER FOR WORD PROCESSORS

(75) Inventors: Ronald A. Fein, Seattle; William B. Dolan, Redmond; John Messerly, Seattle; Edward J. Fries, Kirkland, all of WA (US); Christopher A. Thorpe, Orangeville, UT (US); Shawn J. Cokus, Seattle, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/289,085

(22) Filed: Apr. 8, 1999

Related U.S. Application Data (63) Continuation of application No. 08/622,864, filed on Mar. 29, 1996, now Pat. No. 5,924,108.

(51) Int. Cl.$^7$ .......................... G06F 15/00; G06F 17/00
(52) U.S. Cl. ...................................... 707/531; 707/500
(58) Field of Search .......................... 707/6–530, 531, 707/532, 533; 364/410.1, 411.1

(56) References Cited

U.S. PATENT DOCUMENTS

| | | | | |
|---|---|---|---|---|
| 4,965,763 A | | 10/1990 | Zamora | 364/900 |
| 5,293,314 A | * | 3/1994 | Sakai | 364/419.07 |
| 5,572,643 A | * | 11/1996 | Judson | 395/793 |
| 5,689,716 A | | 11/1997 | Chen | 395/761 |
| 5,761,497 A | * | 6/1998 | Holt et al. | 395/605 |
| 5,778,397 A | * | 7/1998 | Kupiec et al. | 707/500 |
| 5,867,164 A | * | 2/1999 | Borenstein et al. | 345/357 |

OTHER PUBLICATIONS

Sumita, Ono, Chino, Ukita, and Amano, "A Discourse Structure Analyzer for Japanese Text," Proceedings of the International Conference of Fifth Generation Computer Systems 1992, pp. 1133–1140.

H. P. Luhn, The Automatic Creation of Literature Abstracts, IBM Journal, Apr. 1958, pp. 159–165.

(List continued on next page.)

*Primary Examiner*—Hosain T. Alam
*Assistant Examiner*—Alford W. Kindred
(74) *Attorney, Agent, or Firm*—Lee & Hayes, PLLC (57) ABSTRACT

An author-oriented document summarizer for a word processor is described. The document summarizer performs a statistical analysis to generate a list of ranked sentences for consideration in the summary. The summarizer counts how frequently content words appear in a document and produces a table correlating the content words with their corresponding frequency counts. Phrase compression techniques are used to produce more accurate counts of repeatedly used phrases. A sentence score for each sentence is derived by summing the frequency counts of the content words in a sentence and dividing that tally by the number of the content words in the sentence. The sentences are then ranked in order of their sentence scores. Concurrent with the statistical analysis, during the same pass through the document the summarizer performs a cue-phrase analysis to weed out sentences with words or phrases that have been pre-identified as potential problem phrases. The cue-phrase analysis compares sentence phrases with a pre-compiled list of words and phrases and sets conditions on whether the sentences containing them can be used in the summary. Following the cue-phrase analysis, the summarizer creates a summary containing the higher ranked sentences. The summary may also include a conditioned sentence if the conditions established for inclusion of the sentence have been satisfied. The summarizer then inserts the sentence at the beginning of the document before the start of the text.

8 Claims, 3 Drawing Sheets

OTHER PUBLICATIONS

Kenji Ono, Kazuo Sumita, Seiji Milke, "Abstract Generation Based On Rhetorical Structure Extraction," Proceedings of the 15th International Conference on Computational Linguistics, vol. 1, at pp. 344–348, for a conference held Aug 5–9, 1994 in Kyoto, Japan.

"Test Summarisation," BT Laboratories, retrieved from BT Web site at www.bt.com.

"Short Cuts," Science and Technology section, *The Economist,* Dec. 17th, 1994, pp. 85–86.

Salton, Allan, Buckley, and Singhal, "Automatic Analysis, Theme Generation, and Summarization of Machine–Readable Texts," *Science,* vol. 264, Jun. 3, 1994, pp. 1421–1426.

Newspaper Excerpt on Produce release fom Visual Recall 2.0 by Jessica Davis.

Vallini, "(Solutions) (question–and–answer)", PC Magazine, p. 385, Nov. 1993.*

Stark et al., The working word, PC Magazine, p. 487, Oct. 1990.*

Economist, "(natural language text summarization by computers) (includes related information)", p. 85, Dec. 1994.*

* cited by examiner

DOCUMENT SUMMARIZER FOR WORD PROCESSORS

RELATED APPLICATIONS

This is a continuation of U.S. patent application Ser. No. 08/622,864, filed Mar. 29, 1996, which is now U.S. Pat. No. 5,924,108.

TECHNICAL FIELD

This invention relates to word processors, and more particularly, to document summarizers for word processors.

BACKGROUND OF THE INVENTION

Many people are faced with the daunting task of reading large amounts of electronic textual materials. In the computer age, people are inundated with papers, memos, e-mail messages, reports, web pages, schedules, reference materials, test results, and so on. Unfortunately, many documents do not begin with summaries. Creation of summaries is tedious, requiring the author to re-read the document, identify major themes, and distill the main points of the document into a concise summary. Most authors never bother.

Summarizing a document is even more difficult and time-consuming for a reader. The reader must first read the entire document (or at least skim it) to understand the contents. The reader must then attempt to extract the document's key points from unimportant details.

The problems associated with handling large volumes of un-summarized documents are particularly acute for MIS (Management Information Systems) personnel. These individuals are confronted daily with tasks of organizing, managing, and retrieving documents from large databases. Imagine this typical scenario. An MIS staff member receives a cryptic request to locate all documents that pertain to a topic believed to have been discussed in a several company memos written about three to four years ago. To accommodate this search request, the MIS staff member must first perform a word search for the topic, and then laboriously peruse each hit document in an effort to find the mysterious memos. Without summaries, the staff member is forced to read large portions, if not all, of each document before concluding whether the document is relevant or irrelevant. Being forced to read unnecessary text leads to many wasted hours of the staff member's time.

The problem is less critical, but still troubling, for individual users who are browsing through the Internet or other network to find documents on a related topic. Upon locating a document, the user must either read the document online to determine whether it is relevant (at the cost of additional online expenses), or download the document for later review (at the risk of retrieving an irrelevant document).

To help address these problems, computer-implemented document summarizers have been developed to automatically summarize text-based documents for the readers. The document summarizers examine an existing document, and attempt to create an abstract or summary from the existing text.

Early development on document summarizers centered on statistical approaches to creating summaries. One statistical approach is described in an article by H. P. Luhn, entitled "The Automatic Creation of Literature Abstracts," which was published April 1958 in the IBM Journal at pages 159–165. The Luhn technique assigns to each sentence a "significance" factor derived from an analysis of its words. This factor is computed by ascertaining a cluster of words within a sentence, counting the number of significant words contained in the cluster, and dividing the square of this number by the total number of words in the cluster. The sentences are then ranked according to their significance factor, with one or several of the highest ranking sentences being selected to form the abstract.

Most, if not all, of the document summarizers in use today appear to employ the Luhn technique. Examples of such summarizers include a Text Summariser from BT (formerly British Telecom), Visual Recall from Xsoft Corporation (a subsidiary of Xerox), and In Text from Island Software.

Another approach to summarizing documents is described in an article by Kenji Ono, et al., entitled "Abstract Generation Based on Rhetorical Structure Extraction," which was published in *Proceedings of the 15$^{th}$ International Conference on Computational Linguistics*. Vol. 1, at pages 344–348, for a conference held Aug. 5–9, 1994 in Kyoto, Japan. Their approach involved a linguistic analysis which constructed rhetorical structures representing relations between various chunks of sentences in the body of the section. The rhetorical structure is represented by two levels: intra-paragraph, which analyzes the text according to sentence units, and inter-paragraph, which analyzes the text using paragraph units. Extraction of the rhetorical structure is accomplished using a detailed and sophisticated five-step procedure. The Ono technique is unnecessarily complicated for many situations where a rudimentary summary is all that is desired.

In addition, this technique is highly genre-dependent, producing good summaries only when the text is rich in superficial markers of its discourse structure. It thus works relatively well on the academic prose examined by Ono et al., but will fail on documents written in less formal prose.

When the summaries are created, conventional document summarizers present the results to the reader in one of two formats. The first format is to underline or otherwise highlight the sentences that are deemed to be part of the summary. The second format is to show only the abstracted sentences in paragraph or bullet format, without the accompanying text of the document.

One common problem with the conventional document summarizers is that they are reader-based. These summarizers do not consider summary creation and presentation from the perspective of the author.

Accordingly, there remains a need to provide an author-oriented summarizer for a word processor that helps authors automatically create summaries for their writings, and one which will produce a summary for any text which is presented to it.

SUMMARY OF THE INVENTION

This invention concerns a document summarizer which is particularly helpful in assisting authors in preparing summaries for documents, as well aiding readers in their review of un-summarized documents. For a given text, the document summarizer first performs a statistical analysis to generate a list of ranked sentences for consideration in the summary. The summarizer counts how frequently content words appear in a document and produces a table correlating the content words with their corresponding frequency counts. A sentence score for each sentence is derived by summing the frequency counts of the content words in the sentence and dividing that sum by the number of the content words in the sentence. The sentences are then ranked in order of sentence scores, with higher ranking sentences having comparatively higher sentence scores and lower ranking sentences having comparatively lower sentence scores.

Concurrent with the statistical analysis in the same pass through the document, the document summarizer performs a cue-phrase analysis by consulting a pre-compiled list of words and phrases which serve either as indicators of discourse relationships between adjacent sentences in a document or as an indicator of the overall importance of a particular sentence in a document. The cue-phrase analysis compares the sentence string to this pre-compiled list of cue phrases. Associated with each cue phrase are conditions which are used to determine whether a sentence containing that cue phrase will be used in a summary.

For instance, the list might contain words and phrases which depend on the surrounding context of the document to properly understand the sentence. A sentence that begins, "That is why . . . " or "In contrast to this . . . ," depends on statements made in the preceding sentence(s). The summarizer establishes a condition that a sentence containing a dependent word or phrase may only be included in the summary if the neighboring context from which the word or phrase depends is also included in the summary.

The pre-compiled list also contains cue phrases whose presence in a sentence will result in that sentence being excluded from the summary, no matter how large its statistically-derived score might be. For instance, a sentence which contains the phrase "as shown in Fig. . . . " should not be included in a summary because the referenced figure will not be present.

Following the statistical and cue-phrase analysis phases, the summarizer creates a summary containing the higher ranked sentences. The summary may also include a conditioned sentence (such as one that contains a dependent word or phrase) if the conditions established for inclusion of the sentence have been satisfied. However, the summary never includes prohibited sentences.

The summarizer inserts the sentence at the beginning of the document before the start of the text, or in a new document, based on the user's choice. This placement is convenient and useful to the author. The author is then free to revise the summary as he/she wishes.

DETAILED DESCRIPTION OF THE PREFERRED EMBODIMENT

Figure 1:
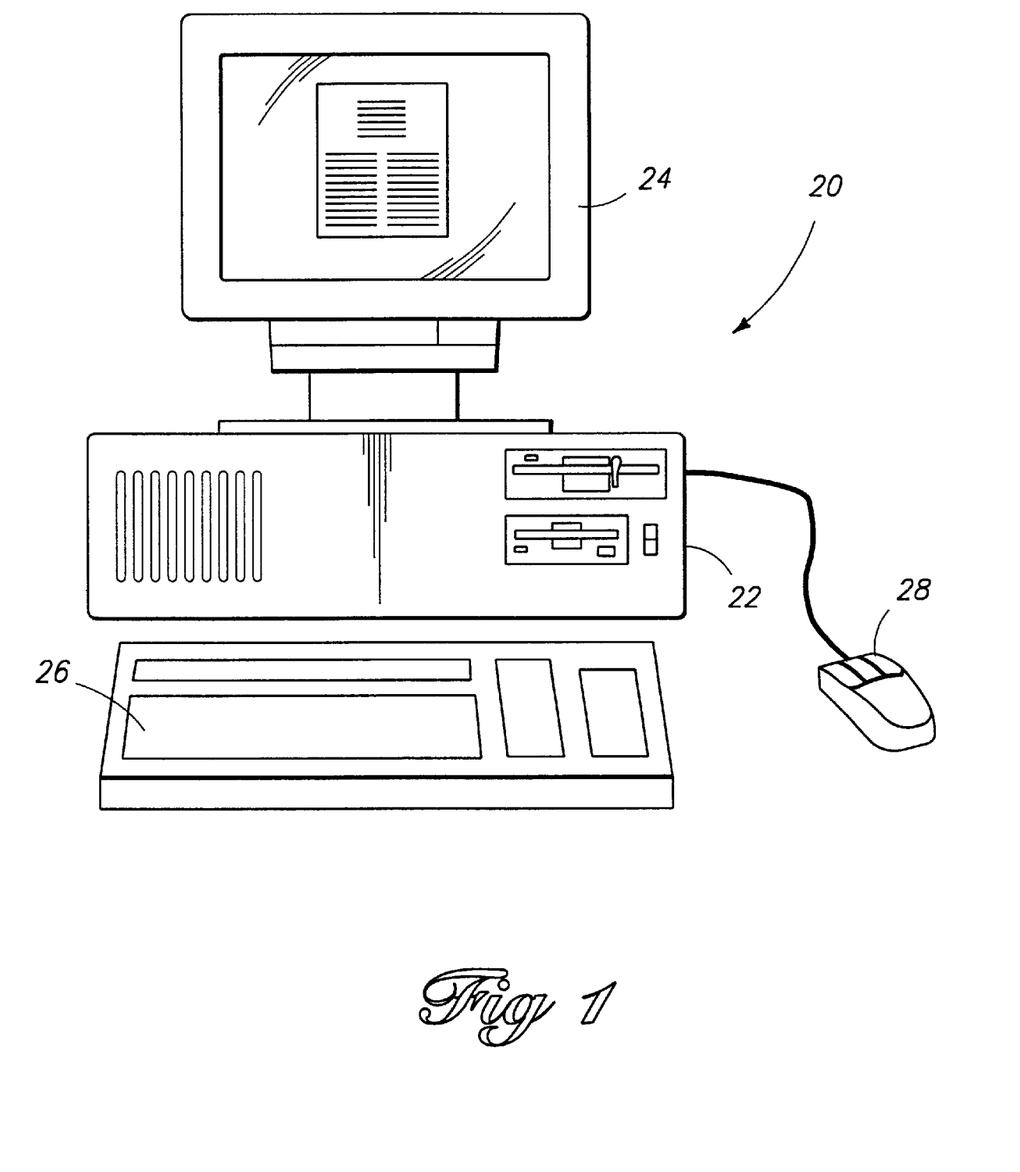
FIG. 1 is a diagrammatic illustration of a computer loaded with a word processing program having a document summarizer.

FIG. 1 shows a computer 20 having a central processing unit (CPU) 22, a monitor or display 24, a keyboard 26, and a mouse 28. Other input devices—such as a track ball, joystick, and the like—may be substituted for or used in conjunction with the keyboard and mouse. The CPU 22 is of standard construction, including memory (disk, RAM, graphics) and a processor.

The computer 20 runs an operating system which supports multiple applications. The operating system is stored in memory in the CPU 22 and executes on the processor. The operating system is preferably a multitasking operating system which allows simultaneous execution of multiple applications. One example operating system is a Windows® brand operating system sold by Microsoft Corporation, such as Windows® 95 or Windows NT™ or other derivative versions of Windows®. However, other operating systems may be employed, such as Mac™OS operating systems employed in Macintosh computers manufactured by Apple Computer, Inc.

This invention concerns a document summarizer that can be implemented in a word processing system. In the illustrated system, the word processing system is implemented as a software application which is stored in the CPU memory or other loadable storage medium and runs on the operating system of computer 20. One example word processing application is Microsoft® Word from Microsoft Corporation, which is modified with the document summarizer described herein.

It is noted that the word processing system might be implemented in other ways. For instance, the word processing system might comprise a dedicated typewriter machine with limited memory and processing capabilities (in comparison to a personal computer) that is used almost exclusively for word processing tasks. It is further noted that the document summarizer described herein can be implemented in other programs, such as an Internet Web browser (e.g., Internet Explorer from Microsoft Corporation), an e-mail program (e.g., WordMail and Exchange from Microsoft Corporation), and the like. However, for discussion purposes, the document summarizer is described in the context of a computer word processing program, such as Microsoft® Word.

When an author wishes to summarize a document, the author initiates the document summarizer function on the word processing program. As used herein, the term "document" means any image that contains text in a format intended for a viewer or other computer program which will then present the text as intelligible language. Examples of documents include conventional word processing documents, e-mail messages, memoranda, web pages, and the like. The document summarizer is activated through a pull down menu or soft button on the graphical user interface window presented by the word processor. Upon activation, the document summarizer begins processing a document to produce a summary.

Figure 2:
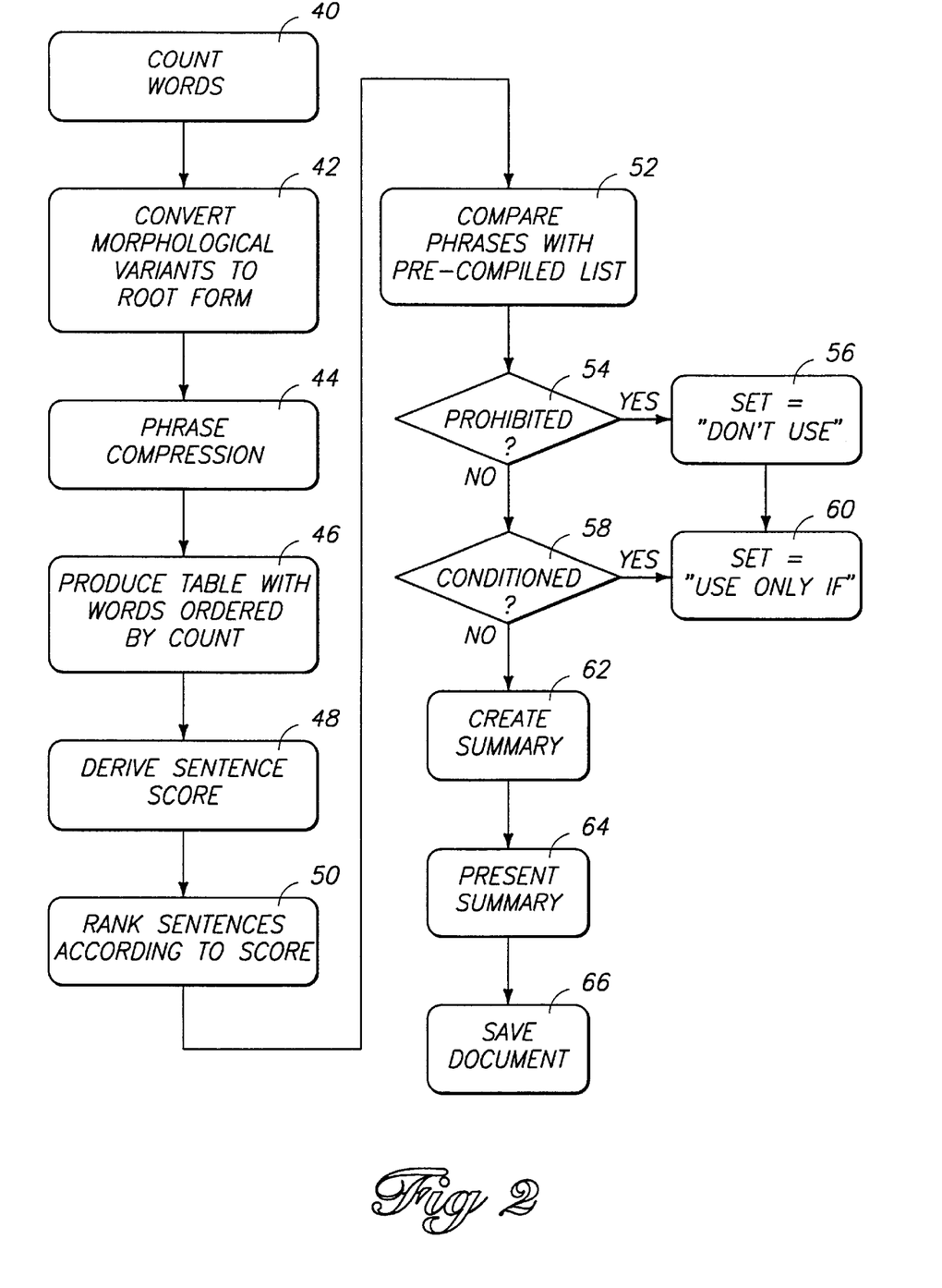
FIG. 2 is a flow diagram of steps in a computer-implemented method for summarizing documents.

FIG. 2 shows the general steps in a computer-implemented method for summarizing a document that are carried out by the computer. The method is described with additional reference to an example document containing a four-sentence paragraph, which is summarized into a two-sentence summary. The paragraph is given as follows:

The Internet is a great place to shop for a computer. Manufacturers have web sites describing their computers. One computer manufacturer offers a money back guarantee. That is why that manufacturer has so many visits to its Internet web site.

In general, the document summarizing process involves three phases: a statistical phase, a cue-phrase phase, and a presentation phase. The statistical and cue-phrase phases are preferably conducted concurrently during a single pass through a document. However, they can be performed sequentially as well, in any order. In the statistical phase, the document summarizer begins by reading each word and counting how frequently content words appear in a document (step 40 in FIG. 2). "Content words" are those words which provide non-grammatical meaning to a text. Nouns are good examples of content words. In the above paragraph, content words include "Internet," "manufacturer," "computer," and so forth.

Within the context of the summarizer, content words can be technically defined as words that are not "stop words." In this context, the set of stop words includes both grammatical function words (e.g. conjunctions, articles, prepositions) and certain high frequency verbs and nouns (e.g. "get", "have") which appear to contribute relatively little semantic content to a sentence, The fundamental attribute of a stop word is that it does not directly contribute to the theme of the document, and the document is extremely unlikely to be about the stop word; therefore it should not be counted. The stop words are preferably maintained in a list stored in memory. In this manner, the processor reads every word, but only counts those words that do not appear on the stop word list. In the above sample paragraph, the first sentence contains the stop words "The," "is," "a," "great," for, and "a."

During the pass through the document, the document summarizer checks for morphological variants of the content words and converts them to their root form (step 42). For example, the words "walking," "walked," and "walks" are all morphological variants of the root form "walk." In this way, the root form and associated variants are all counted as the same word. In the above example paragraph, the words "computer" and "computers" are counted as the same word, as are the words "manufacturer" and "manufacturers."

The summarizer also analyzes the words for possible phrase compression (step 44). Sets of content words that appear repeatedly in the same order are counted as if they are a single content word. For example, the word pair, "Microsoft Corporation," if occurring a sufficient number of times in that exact order, might be counted as a single word. The words in such phrases, if taken separately, do not by themselves add any meaning to the sentence. Without phrase compression, the words "Microsoft" and "Corporation" would each be counted independently, a result which might undesirably skew the importance of the sentences that contain them. In the above example paragraph, the phrase "web site" occurs the same way on two occasions and might therefore be a candidate for phrase compression. Also assume that the phrase "money back guarantee" is compressed into one word phrase that is counted singly.

When all of the content words in the document are counted, the document summarizer produces a table which correlates the content words with their corresponding frequency counts (step 46). The content words can be ordered with the most frequently occurring words appearing at the top of the table. Table 1 shows a ranking of content words from the above example document:

TABLE 1

Rank of Content Words

| Content Word | Frequency Count |
| --- | --- |
| computer | 3 |
| manufacturer | 3 |
| Internet | 2 |
| web site | 2 |
| place | 1 |
| shop | 1 |
| money back guarantee | 1 |
| visit | 1 |

At step 48, the document summarizer derives a sentence score for individual sentences within the document according to their respective content words. Sentences with more content words that appear more frequently in the document are ranked higher than both sentences with fewer high-frequency content words and sentences with content words that appear less frequently in the document. More specifically, the document summarizer ranks the sentences according to their average word score. This value is derived by summing the frequency counts for all content words that appear in the sentence and dividing that tally by the number of the content words in the sentence. The sentence score is represented as follows:

Sentence Score=Sum of Word Frequency Counts÷Number of Words

The sentences are then ranked in order of their sentence scores (step 50 in FIG. 2). Higher ranking sentences have comparatively higher sentence scores and lower ranking sentences have comparatively lower sentence scores. Using the word counts in Table 1, the score for the first sentence in the example paragraph is 1.75, as follows:

Sentence #1=[Internet(2)+Place(1)+Shop(1)+Computer(3)] ÷4 Words=1.75

Scores for the remaining three sentences are also computed. Table 2 shows the ranking for the four sentences in the example paragraph.

TABLE 2

Rank of Sentences

| Sentences | Score |
| --- | --- |
| #2 Manufacturers have web sites describing their . . . | 2.67 |
| #3 One computer manufacturer offers a money back . . . | 2.33 |
| #4 That is why that manufacturer has so many visits . . . | 2.00 |
| #1 The Internet is a great place to shop for a computer. | 1.75 |

It is noted that other techniques could be used to derive a sentence score. For example, the score might be calculated by dividing the total frequency count by the total number of all words (including stop words) in sentence. An alternative approach is to simply sum the content word counts, without any averaging. Additionally, arithmetic and statistical tricks can be used, such as basing the sentence score on a median score of a content word.

Steps 40–50 constitute the statistical phase of the summarizing method. Concurrent with the statistical phase, the document summarizer performs during the same pass through the document a cue-phrase analysis to exploit any explicit discourse markers present in the text. In general, the cue-phrase analysis seeks to identify phrases that might potentially render a sentence confusing or difficult to understand if included in the summary. In this implementation, the document summarizer compares the sentence string to a pre-compiled list of words and phrases (step 52).

Upon identification of words or phrases that appear on the list, the document summarizer designates the entire sentence as either "prohibited" or "conditioned." If a sentence is "prohibited," the document summarizer takes action to prevent the sentence from being included in the summary, regardless of its sentence score (steps 54 and 56). If a sentence is deemed "conditioned," the document summarizer will only include the sentence in the summary if the condition is met (steps 58 and 60). One example of a conditioned sentence is one that depends on the previous sentence or surrounding context to understand its meaning. A sentence that begins "He said . . . " is only clear if the reader knows who "He" is. Accordingly, this sentence depends on a previous context and will be used in the summary only if the previous sentence identifying "He" is also used in the summary.

Table 3 shows example words and phrases from the pre-compiled cue-phrase list that render a sentence as "prohibited" or "conditioned."

Table 3: Cue-Phrase List
Conditional Words or Phrases
  Sentence-initial Personal Pronouns: He, She, It, They, Their
  Sentence-initial Demonstrative Pronouns: These, That, This, Those
  Sentence-initial Quantifiers: All, Most, Many
  Both, Which
  Conjunction (i.e., And, Nor, But, Or, Yet, So, For)
  Specific Reference (i.e., Such, That is)
  Extension (i.e., Related to this)
  Causation (i.e., Therefore, Thus, And so)
  Contrast (i.e., However, Nonetheless, In spite of this)
  Reinforcement (i.e., Indeed, Accordingly)
  Supplementation (i.e., At any rate, In reply)
Prohibited Words or Phrases
  Reference (i.e., In FIG. 1 . . . , as shown in Chart A)

Applying the cue phrase analysis to the sample paragraph reveals that the fourth sentence is conditional because it contains the phrase "That is why. . . " This phrase is listed on the cue-phrase list as a depends-on-previous phrase, meaning that the phrase relies on a previous sentence for context. In this case, the preceding third sentence explains that one manufacture offers a money back guarantee which is the supporting reason why the manufacture is said, in the fourth sentence, to have many visits to its web sit. Were the fourth sentence to appear in a summary without the third sentence, a reader would not understand why the manufacturer has so many visits to its web site. Accordingly, the document summarizer sets a condition that the fourth sentence is only used in the summary if the third sentence is also used.

In this example, it turns out that even without the cue phrase list, the fourth sentence will only appear if the third sentence is also used for the simple reason that the third sentence has a higher score than the fourth sentence. This result is the product of a short document with few sentences. However, in larger documents with more sentences, the cue-phrase list will effectively institute conditions on certain sentence uses. For instance, suppose that the fourth sentence in the above four-sentence paragraph had a higher sentence score that the third sentence. In this case, the fourth sentence is only used if the lower scoring, preceding third sentence is used.

Following the statistical and cue-phrase analysis phases, the document summarizer creates a summary containing the higher ranked sentences which survive the cue-phrase analysis (step 62). The summary may include a conditioned sentence in the event that the relevant condition is satisfied, but will exclude any prohibited sentences. The length of the summary is an author-controlled parameter. From Table 2, a two-sentence summary for the above sample paragraph is as follows:

Manufacturers have web sites describing their computers. One computer manufacturer offers a money back guarantee.

The two sentences in the summary had the highest ranking. It is noted that the sentences are organized in the summary according to their order of appearance in the document, not in order of their rank. In this case, the appearance and rank order are the same, but this does not have to be the case. For example, assume that the third sentence received a higher rank than the second sentence. In the resultant summary, the lower-ranked second sentence would still precede the higher-ranked third sentence because it appears before the third sentence in the document. Ordering a summary based on rank reorganizes the author's sentence sequence and might result in a confusing and less readable summary.

The two sentence summary did not contain any cue-phrase sentences. However, were the summary expanded to three sentences, it would read as follows:

Manufacturers have web sites describing their computers. One computer manufacturer offers a money back guarantee. That is why that manufacturer has so many visits to its Internet web site.

In this summary, the last sentence (i.e., the original fourth sentence) had the third highest sentence score (see Table 2). This sentence also happens to be a conditioned sentence because it contains the phrase "That is why . . . " which appears on the pre-compiled cue-phrase list. Accordingly, the sentence is used only if the condition is met. In this case, the condition is a depends-on-previous condition, which stipulates that a sentence belonging to this class can be included in a summary only if the preceding sentence is also included. Since the third sentence does appear in the summary, the depends-on-previous condition is met and hence, the fourth sentence can be included in the summary.

Figure 3A:
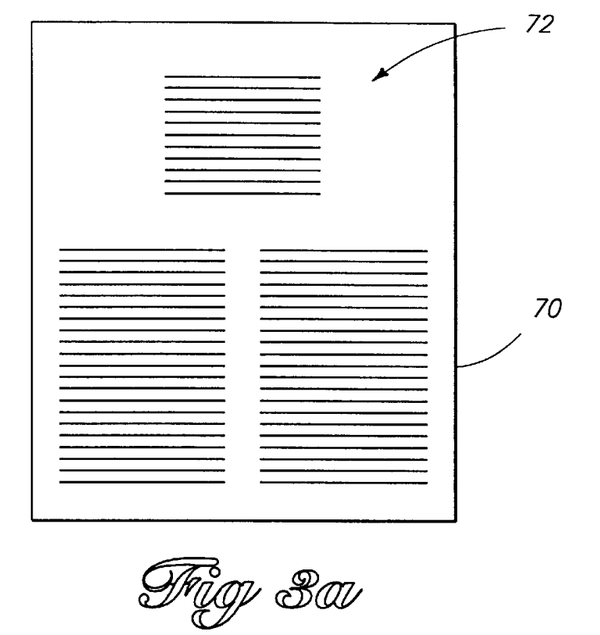
FIGS. 3a and 3b show documents with summaries inserted therein to illustrate two different display presentations of a summary.
Figure 3B:
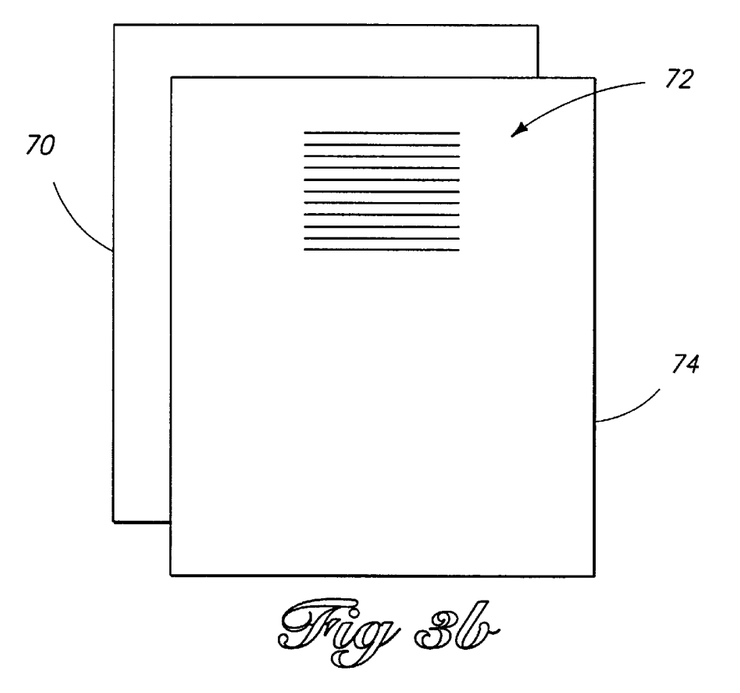

After the summary is created, the document summarizer displays the summary on the computer monitor in one of four, author-selected UI (user interface) formats (step 64). The first UI format is to insert the summary at the top of the existing document. The document summarizer locates the top of the file, and inserts the summary text before the opening paragraph of the document. FIG. 3*a* shows an existing document 70 with a summary 72 inserted at the top. A second UI format is to create or open a new document and insert the summary in the new document. FIG. 3*b* illustrates a new document 74 opened and overlaid on an existing document 70. The summary 72 is inserted in the new document 74.

The third UI format is to underline or otherwise highlight the important sentences used in the summary. The fourth UI format is to show only the summary sentences without the accompanying text. These third and fourth formats are similar to the conventional presentations described in the Background of the Invention Section.

Once the summary is created and displayed to the author, the author can save the summary in the existing document or new document to memory (step 66).

A modification of the above computer-implemented method concerns the statistical phase. In the method described above, the content words are counted and all of the sentence scores are derived using the same frequency counts. In some instances, there may be occasions where certain words in the higher ranking sentences unduly dominate and influence the scores of the sentences.

The modified technique is an iterative scoring approach. Under this technique, the summarizer initially scores all of the sentences as above on the first iteration. Then, for the next iteration, the summarizer removes the influence of the highest ranking sentence and re-scores the remaining sentences as if the highest ranking sentence was not present. For the next iteration, the influence of the highest scoring sentence found in the previous iteration is removed, and the remaining sentences are again re-scored as if the two highest ranking sentences were not present. This process continues for all of the sentences.

To demonstrate this modified statistical analysis, let's apply the analysis to the four-sentence paragraph used above. The first step is to count the content words, while accounting for the stop words and phrase compression. The word count yields Table 1. Next, the sentence scores are derived. The first iteration yields the same score of 2.67 for sentence #2. Here, however, is where the modified method begins to diverge. To remove the influence of the highest ranking sentence, the document summarizer re-computes the sentence scores as if the second sentence were never present in the document. The frequency counts of the content words are reduced accordingly. Table 4 is a modified version of Table 1 and reflects the absence of the second sentence.

TABLE 4

Rank of Content Words With Second Sentence Omitted

| Content Word | Frequency Count |
| --- | --- |
| computer | 3 − 1 = 2 |
| manufacturer | 3 − 1 = 2 |
| Internet | 2 |
| web site | 2 − 1 = 1 |
| place | 1 |
| shop | 1 |
| money | 1 |
| visit | 1 |

Next, the remaining three sentences are re-scored using the modified frequency counts for the content words. This results in a ranking of 1.67 for the sentence three, which is second highest.

Sentence #3=[computer(2)+manufacturer(2)+money(1)] ÷3 Words= 1.67

The influence of sentence #3 is then removed, and the frequency counts of the content words are reduced accordingly. Table 5 is a modified version of Table 4 and accounts for the absence of the second and third sentences.

TABLE 5

Rank of Content Words With Second and Third Sentences Omitted

| Content Word | Frequency Count |
| --- | --- |
| computer | 3 − 2 = 1 |
| manufacturer | 3 − 2 = 1 |
| Internet | 2 |
| web site | 2 − 1 = 1 |
| place | 1 |
| shop | 1 |
| money | 1 − 1 = 0 |
| visit | 1 |

Continuing this process through the remaining two sentences yields a new sentence rank, given in Table 6.

TABLE 6

Rank of Sentences With Iterative Re-Scoring Method

| Sentences | Score |
| --- | --- |
| #2 Manufacturers have web sites describing their . . . | 2.67 |
| #3 One computer manufacturer offers a money back . . . | 1.67 |

TABLE 6-continued

Rank of Sentences With Iterative Re-Scoring Method

| Sentences | Score |
| --- | --- |
| #1 The Internet is a great place to shop for a computer. | 1.33 |
| #4 That is why that manufacturer has so many visits to . . . | 1.00 |

Notice that using the iterative re-scoring method yields a slightly different sentence ranking with sentence #1 being ranked higher than sentence number #4. A two-sentence summary using the iterative re-scoring method is identical to the two-sentence summary created using the method described above. However, a three-sentence summary is considerably different. A three-sentence summary using Table 6 is as follows:

The Internet is a great place to shop for a computer. Manufacturers have web sites describing their computers. One computer manufacturer offers a money back guarantee.

This three-sentence summary is a good example of the situation where the sentences used in the summary are written in order of the appearance in the document, and not in order of their rank. The beginning sentence in the summary is actually the third highest ranked sentence. Nonetheless, it is written in the summary as the first sentence because it appears in the document before the higher-ranked sentences #2 and #3.

In the above example, the counts of the content words appearing in the higher ranking sentences are all reduced by a full count. In other implementations, the frequency counts can be changed by varying degrees depending upon the degree of influence introduced by the higher ranking sentences the manufacturer or author desires to remove. For instance, the summarizer might compensate by subtracting a fractional amount (say, 0.3 or 0.5) from each count corresponding to words that appear in the highest ranking sentence. Alternatively, the compensation amount might vary depending upon whether the content word has a high or low frequency count compared to other content words. The amount that word counts are compensated during this dynamic scoring process can be determined and set by the manufacturer or author according to various statistical or mathematical approaches which appropriately negate the influence of the content words appearing in the higher ranking sentences.

The document summarizer is advantageous over prior art summarizers because it is designed from the author's standpoint. It enables authors to automatically create summaries of their writings using a combined statistical and cue-phrase approach. Once created, the summarizer presents a UT that enables the author to place the summary at the top of the document or in a new document. This placement is convenient and useful to the author. The author is then free to revise the summary as he/she wishes.

Another advantage of the document summarizer stems from the combined statistical and cue phrase processing. This dual analysis is beneficial because the statistical component ensures that a summary will always be produced, and the cue phrase component improves the quality of the resulting summary.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

What is claimed is:

1. A computer-implemented method for summarizing documents, comprising the following steps:

(a) counting how frequently content words appear in a document to produce frequency counts for corresponding content words;

(b) scoring individual sentences according to the content words contained in the sentences;

(c) identifying a sentence with the highest score;

(d) adjusting the frequency counts of the content words that appear in the highest scoring sentence to remove an influence of the highest scoring sentence; and (e) re-scoring the sentences based on the adjusted frequency counts.

2. A computer-implemented method as recited in claim 1 further comprising the step of repeating steps (b) to (e).

3. A computer-implemented method as recited in claim 1 further comprising the step of performing a cue-phrase analysis by comparing words and phrases in the sentences with a pre-compiled list of words and phrases and setting conditions on use of sentences that contain any words or phrases on the list.

4. A computer-implemented method as recited in claim 3 further comprising the step of creating a summary which contains higher scoring sentences and which may include conditioned sentences in an event that the conditions are satisfied.

5. A word processing application stored in a storage medium which directs a computer to perform the step in the computer-implemented method as recited in claim 1.

6. An electronic mail application stored in a storage medium which directs a computer to perform the steps in the computer-implemented method as recited in claim 1.

7. An Internet web browser application stored in a storage medium which directs a computer to perform the steps in the computer-implemented method as recited in claim 1.

8. A computer programmed to perform the step in the computer-implemented method as recited in claim 1.

* * * * *

UNITED STATES PATENT AND TRADEMARK OFFICE
CERTIFICATE OF CORRECTION

PATENT NO.    : 6,349,316 B2
DATED         : February 19, 2002
INVENTOR(S)   : Fein et al.

It is certified that error appears in the above-identified patent and that said Letters Patent is hereby corrected as shown below:

<u>Column 10,</u>
Line 51, replace "UT" with -- UI --.

Signed and Sealed this

Eighteenth Day of June, 2002

*Attest:*

*Attesting Officer*

JAMES E. ROGAN
*Director of the United States Patent and Trademark Office*